US010940852B2

United States Patent
Yang et al.

(10) Patent No.: US 10,940,852 B2
(45) Date of Patent: Mar. 9, 2021

(54) METHOD AND SYSTEM FOR ENHANCED YAW RESPONSE FOR A VEHICLE

(71) Applicant: Volvo Car Corporation, Gothenburg (SE)

(72) Inventors: Derong Yang, Vastra Frolunda (SE); Mats Jonasson, Partille (SE)

(73) Assignee: Volvo Car Corporation, Gothenburg (SE)

( * ) Notice: Subject to any disclaimer, the term of this patent is extended or adjusted under 35 U.S.C. 154(b) by 216 days.

(21) Appl. No.: 16/252,794

(22) Filed: Jan. 21, 2019

(65) Prior Publication Data
US 2019/0276008 A1 Sep. 12, 2019

(30) Foreign Application Priority Data
Mar. 6, 2018 (EP) .................................... 18160236

(51) Int. Cl.
*B60W 30/045* (2012.01)
*B60K 6/40* (2007.10)
(Continued)

(52) U.S. Cl.
CPC ............. *B60W 30/045* (2013.01); *B60K 6/40* (2013.01); *B60T 8/17551* (2013.01);
(Continued)

(58) Field of Classification Search
CPC ......... B60W 30/045; B60W 30/18145; B60W 2520/125; B60W 2520/14; B60W 40/114; B60T 8/17551; B60Y 2200/92
See application file for complete search history.

(56) References Cited

U.S. PATENT DOCUMENTS 5,265,020 A 11/1993 Nakayama
7,395,736 B2 7/2008 Davidsson et al.
(Continued)

FOREIGN PATENT DOCUMENTS

EP 2484572 A1 8/2012
JP 2007112367 A 5/2007
JP 2014058315 A 4/2014

OTHER PUBLICATIONS

Siampis et al.; Electric Rear Axle Torque vectoring for Combined Yaw Stability and Velocity Control near the Limit of Handling; 52nd IEEE Conf. on Decision and Control; Dec. 10-13, 2013; Florence, Italy (Year: 2013).*
(Continued)

*Primary Examiner* — Michael J Zanelli
(74) *Attorney, Agent, or Firm* — Clements Bernard Walker; Christopher L. Bernard

(57) ABSTRACT

A method and a system for controlling wheel torques of a vehicle (201) to provide a desired vehicle yaw torque during a cornering event. A set of indirect yaw torque parameters (a,k) indicative of the indirect vehicle yaw torque contribution from lateral wheel forces are determined based on the present wheel torque data (PtTq) and the lateral acceleration data (LatAcc) and a model. A required torque for the front axis wheels (202, 204) and a required torque for the rear axis wheels (206, 208) are calculated such that the desired longitudinal wheel torque and the target vehicle yaw ($M_{zReq}$) provided, taking into account the set of indirect yaw torque parameters. The calculated torques are applied to the respective individual wheels.

13 Claims, 7 Drawing Sheets

(51) Int. Cl.
*B60W 20/00* (2016.01)
*B60W 50/00* (2006.01)
*B60W 30/18* (2012.01)
*B60T 8/1755* (2006.01)

(52) U.S. Cl.
CPC ...... *B60W 20/00* (2013.01); *B60W 30/18145* (2013.01); *B60W 50/00* (2013.01); *B60T 2270/303* (2013.01); *B60W 2050/0026* (2013.01); *B60W 2520/105* (2013.01); *B60W 2520/125* (2013.01); *B60W 2520/14* (2013.01); *B60W 2520/30* (2013.01); *B60W 2720/30* (2013.01); *B60Y 2200/92* (2013.01)

(56) References Cited

U.S. PATENT DOCUMENTS 8,672,790 B2   3/2014   Severinsson et al.
9,376,101 B2   6/2016   Goodrich et al.
2004/0176899 A1* 9/2004 Hallowell .......... B60K 23/0808
                                                      701/84
2016/0138695 A1   5/2016   Tronnberg
2018/0236989 A1* 8/2018 Lian .................... B60L 7/18

OTHER PUBLICATIONS

Sill et al.; Managing Axle Saturation for Vehicle Stability Control with Independent Wheel Drivers; 2011 American Control Conf. on O'Farrell Street, San Francisco, CA; Jun. 29-Jul. 2011 (Year: 2011).*
Vignati et al.; Electric powertrain layouts analysis for controlling vehicle lateral dynamics with Torque Vectoring; 2017 Intl. Conf. of Electrical and Electronic Tech. for Automotive; p. 1-5; Jun. 1, 2017 (Year: 2017).*
Ankur Arora, Fereydoon Diba & Ebrahim Esmailzadeh (2017) Experimental investigation of active yaw moment control system using a momentum wheel, Systems Science & Control Engineering, 5:1, 108-116, DOI: 10.1080/21642583.2017.1288588.
Sep. 4, 2018 European Search Report issue on International Application No. EP18160236.

* cited by examiner

| A1,k1 | LatAcc1, PtTq1 |
| A2,k2 | LatAcc2, PtTq2 |
| A3,k3 | LatAcc3, PtTq3 |
| | |
| | |
| | |
| | |
| An,kn | LatAccn, PtTqn |

METHOD AND SYSTEM FOR ENHANCED YAW RESPONSE FOR A VEHICLE

CROSS-REFERENCE TO RELATED APPLICATION

The present patent application/patent claims the benefit of priority of co-pending European Patent Application No. 18160236.8, filed on Mar. 6, 2018, and entitled "METHOD AND SYSTEM FOR ENHANCED YAW RESPONSE FOR A VEHICLE," the contents of which are incorporated in full by reference herein.

TECHNICAL FIELD

The present invention relates to a method for controlling wheel torques of a vehicle to provide a desired vehicle yaw torque. The present invention further relates to a corresponding system and to a vehicle.

BACKGROUND ART

Vehicle understeer and vehicle oversteer create an unpleasant driving experience for the driver and reduces vehicle stability. The vehicle stability may be particularly affected when driving the vehicle through a turn. One way to reduce the understeer and the oversteer effects on a vehicle is to apply an external yaw torque on the vehicle body. Such external yaw torque may be applied by for example differential braking techniques or by so called torque vectoring.

Briefly, with differential braking different brake forces are applied to the individual wheels of the vehicle which in turn results in a yaw torque on the vehicle body.

Torque vectoring is today a more common approach to generate an external yaw torque. Torque vectoring causes an external yaw torque on the vehicle by applying different longitudinal forces to the individual wheels of the vehicle by applying drive or brake torques from the vehicle power train or the brakes.

U.S. Pat. No. 9,376,101 describes one example of torque vectoring applied to an all-wheel drive powertrain system for a vehicle. U.S. Pat. No. 9,376,101 discloses to apply differential brake torque or powertrain torque depending on the specific driving situation.

However, during a cornering event the applied longitudinal forces acting on the wheels caused by either a brake torque or a powertrain torque have considerable influence on the lateral forces acting on the wheels, and thereby an indirect yaw torque component is generated in addition to the intended external yaw torque. This additional yaw torque component affects the vehicle stability during a cornering event with the vehicle.

Accordingly, there is room for improvements in the controlling of wheel torques for a vehicle during cornering events.

SUMMARY

In view of above-mentioned prior art, it is an object of the present invention to provide an improved method and system for controlling wheel torques for a vehicle such that indirect yaw torque caused by lateral wheel forces is automatically corrected for to thereby improve the vehicle stability during a cornering event.

According to a first aspect of the invention, there is provided a method for controlling wheel torques of a vehicle to provide a desired vehicle yaw torque during a cornering event, the method comprising: determining lateral acceleration data indicative of the lateral acceleration of the vehicle; retrieving present wheel torque data indicative of the wheel torques presently applied to each of the wheels by the power train of the vehicle; retrieving a desired longitudinal wheel torque value based on driver input; retrieving a target vehicle yaw torque value based on driver input; determining a set of indirect yaw torque parameters indicative of the indirect vehicle yaw torque contribution from lateral wheel forces based on the present wheel torque data and the lateral acceleration data and a model comprising at least one relation between indirect yaw torque and longitudinal wheel torque distribution between the front axis wheels and the rear axis wheels for at the least one pair of wheel torque data and lateral acceleration data, calculating a required torque for the front axis wheels and a required torque for the rear axis wheels such that the desired longitudinal wheel torque and the target vehicle yaw is provided taking into account the set of indirect yaw torque parameters, and applying the calculated torques to the respective individual wheels.

The present invention is based on the realization that the indirect yaw torque caused by lateral wheel forces may be directly taken into account for when calculating the required torques for the front and rear wheels by applying a model for the indirect yaw torque. By including the indirect yaw torque parameters, determined from the model in the calculation of the torques to be applied to the wheels of the vehicle, the method automatically includes to compensate for the indirect yaw torque.

The calculated toques may be applied individually to each of the wheels independent of each other if the vehicle is equipped with the actuators to drive each wheel independent of the other wheels.

Furthermore, the model may comprise of pre-stored model relationships for several sets of the indirect yaw torque parameters indicative of the indirect yaw torque. According to one embodiment, the method comprises mapping the data set comprising the lateral acceleration data, and the present wheel torque data to a set of pre-stored model relationships pre-determined for multiple sets of indirect yaw torque parameters, and selecting one set of indirect yaw torque parameters based on a match between the data set and one of the model relationships. In other words, based on a model, indirect yaw torque versus longitudinal wheel torque distribution may be pre-determined for various combinations of lateral acceleration data and wheel torque data. Each of the pre-determined relations is associated with a respective set of indirect yaw torque parameter values. Thus, knowledge of the lateral acceleration data and the present wheel torque data allows for determining the corresponding set of indirect yaw torque parameters. In this way, there is reduced need for high processing power of vehicle electric control units (ECU) since the indirect yaw torque does not have to be explicitly calculated online for each sample time. Thus, the required torques can be calculated faster which enables faster and at least close to real-time application of the required torques as they are calculated, and thereby provide further improved vehicle stability.

For example, and according to another embodiment, mapping includes comparing the data set to pre-stored data comprised in a look up table. In other words, the look-up table has a stored set of combinations of lateral acceleration data and wheel torque data, and for each of the combinations there is a corresponding set of indirect yaw torque parameters indicative of the indirect yaw torque. A look up table provides for a fast and simple way to determine the set of indirect yaw torque parameters indicative of the indirect yaw torque.

According to embodiments of the invention, the torques are calculated for at least the total wheel torque required for the front axis wheels, and the wheel torque required for each of the rear axis wheels individually, wherein the torques are applied to the respective individual wheels. Accordingly, a combination of torque vectoring and all wheel drive is advantageously obtained. The torque to be applied to the front wheel axis may be provided from an internal combustion engine and the torque applied to the rear axis wheels are provided from at least one electric machine.

In one possible implementation, it may be included to determine longitudinal acceleration data indicative of the longitudinal acceleration of the vehicle; estimating a relationship between the indirect yaw torque and the longitudinal wheel torque distribution based on the longitudinal acceleration data, the lateral acceleration data, and the present wheel torque data, and determining the indirect yaw torque parameters indicative of the indirect vehicle yaw torque contribution from lateral wheel forces from the estimated relationship. Thus, it is also possible to estimate the relationship between the indirect yaw torque and the longitudinal wheel torque distribution and from the relationship directly obtain the indirect yaw torque parameter indicative of the indirect vehicle yaw torque contribution. The longitudinal acceleration may be calculated from the present wheel torque data, or it may be measured using e.g. a gyroscope of accelerometer.

According to a second aspect of the invention, there is provided a system for controlling wheel torques of a vehicle to provide a desired vehicle yaw torque during a cornering event, the system comprising: a sensor for determining lateral acceleration data indicative of the lateral acceleration of the vehicle; processing circuitry configured to: receive present wheel torque data indicative of the wheel torque presently applied to each of the wheels of the vehicle by the power train of the vehicle; determine a desired longitudinal wheel torque based on driver input; determine a target vehicle yaw torque based on driver input; determine a set of indirect yaw torque parameters indicative of the indirect vehicle yaw torque contribution from lateral wheel forces based on the present wheel torque data and the lateral acceleration data and a model comprising at least one relation between indirect yaw torque and longitudinal wheel torque distribution between the front axis wheels and the rear axis wheels for at the least one pair of wheel torque data and lateral acceleration data, calculate a required torque for the front axis wheels and a required torque for the rear axis wheels such that the desired longitudinal wheel torque and the target vehicle yaw is provided taking into account the set of indirect yaw torque parameters, and control the power train of the vehicle to apply the calculated torques to the respective individual wheels.

The sensor may for example be a gyroscope.

The calculated torques for the front axis wheels may be applied by an internal combustion engine and the calculated torques for the rear axis wheels are applied by at least one electric machine.

The calculated torques for the rear axis wheels may be applied by one electric machine for each rear wheel.

Accordingly, it was further realized that torque vectoring which in itself suffers from the above mentioned problems, may be combined with an all-wheel drive capability which provides the possibility to apply individual torques independently to individual wheels on the same axis. Thus, with the invention, is becomes possible to seamlessly integrate torque vectoring with an all wheel drive system.

Processing circuitry and/or a control unit may include at least one microprocessor, microcontroller, programmable digital signal processor or another programmable device.

Effects and features of the second aspect of the invention are largely analogous to those described above in connection with the first aspect of the invention.

There is further provided a vehicle comprising the system.

Furthermore, the vehicle is preferably an all-wheel drive vehicle comprising an internal combustion engine for providing torque to front axis wheels of the vehicle, one electric machine for providing torque to a first rear axis wheel, and another electric machine for providing torque to a second rear axis wheel.

In summary, the present invention relates to a method and a system for controlling wheel torques of a vehicle to provide a desired vehicle yaw torque during a cornering event. A set of indirect yaw torque parameters indicative of the indirect vehicle yaw torque contribution from lateral wheel forces are determined based on the present wheel torque data and the lateral acceleration data and a model. A required torque for the front axis wheels and a required torque for the rear axis wheels are calculated such that the desired longitudinal wheel torque and the target vehicle yaw is provided, taking into account the set of indirect yaw torque parameters. The calculated torques are applied to the respective individual wheels.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing example embodiments of the invention, wherein.

DESCRIPTION OF EMBODIMENTS

Figure 1:
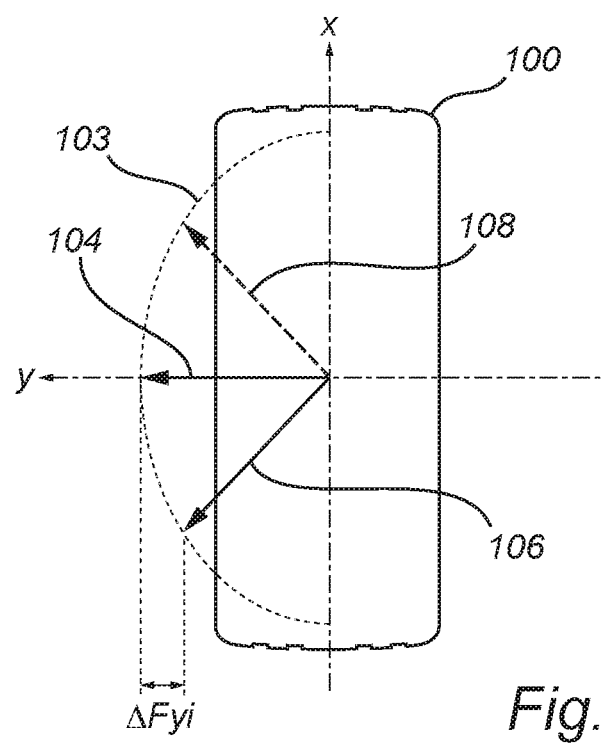
FIG. 1 schematically illustrates a schematic top view of a vehicle tire and a friction limit.

In the present detailed description, various embodiments of the system and method according to the present invention are described. However, this invention may be embodied in many different forms and should not be construed as limited to the embodiments set forth herein; rather, these embodiments are provided for thoroughness and completeness, and fully convey the scope of the invention to the skilled person. Like reference characters refer to like elements throughout.

FIG. 1 illustrates a top view of a vehicle tire 100. A so-called friction limit is generally given by $\mu F_{zi}$ where $\mu$ is the friction coefficient for the contact interface between the road surface and the tire i, and $F_z$ is the normal force (in the direction z) orthogonal to the plane of the contact interface. The friction limit may ideally be represented by a circle with radius $\mu F_{zi}$. However, a more accurate representation is in the form of an ellipse 103 (with vertex at $\mu F_{zi}$) according to the present side slip angle or the present steering angle of the vehicle. The friction limit 103 indicates the maximum friction force provided by the contact between the road surface and the tire.

The force represented by the arrow 104 shows the resultant lateral force on the wheel during a cornering event to the left (in the direction of the force arrow 104) without braking or accelerating with the vehicle. The force 104 is directed orthogonal to the wheel base of the tire 100, in other words in the lateral direction (y).

If the wheel with the tire 100 is braking during the cornering event, there will additionally be a braking force acting in a rear ward direction, i.e. in the −x direction which instead provides resultant force 106. As indicated in FIG. 1, the difference between the forces 104 and 106 results in a loss ($\Delta F_{yi}$) in lateral force. This loss ($\Delta F_{yi}$) in lateral forces causes an indirect yaw torque on the vehicle.

It is further noted that with a similar reasoning as above, it is understood that by accelerating the vehicle through the cornering event will provide a resultant force 108 pointing at least partly in the forward direction of the vehicle. The difference between the resultant force 108 and the lateral force 104 also results in a lateral force and thus produces an indirect yaw torque on the vehicle.

Figure 2:
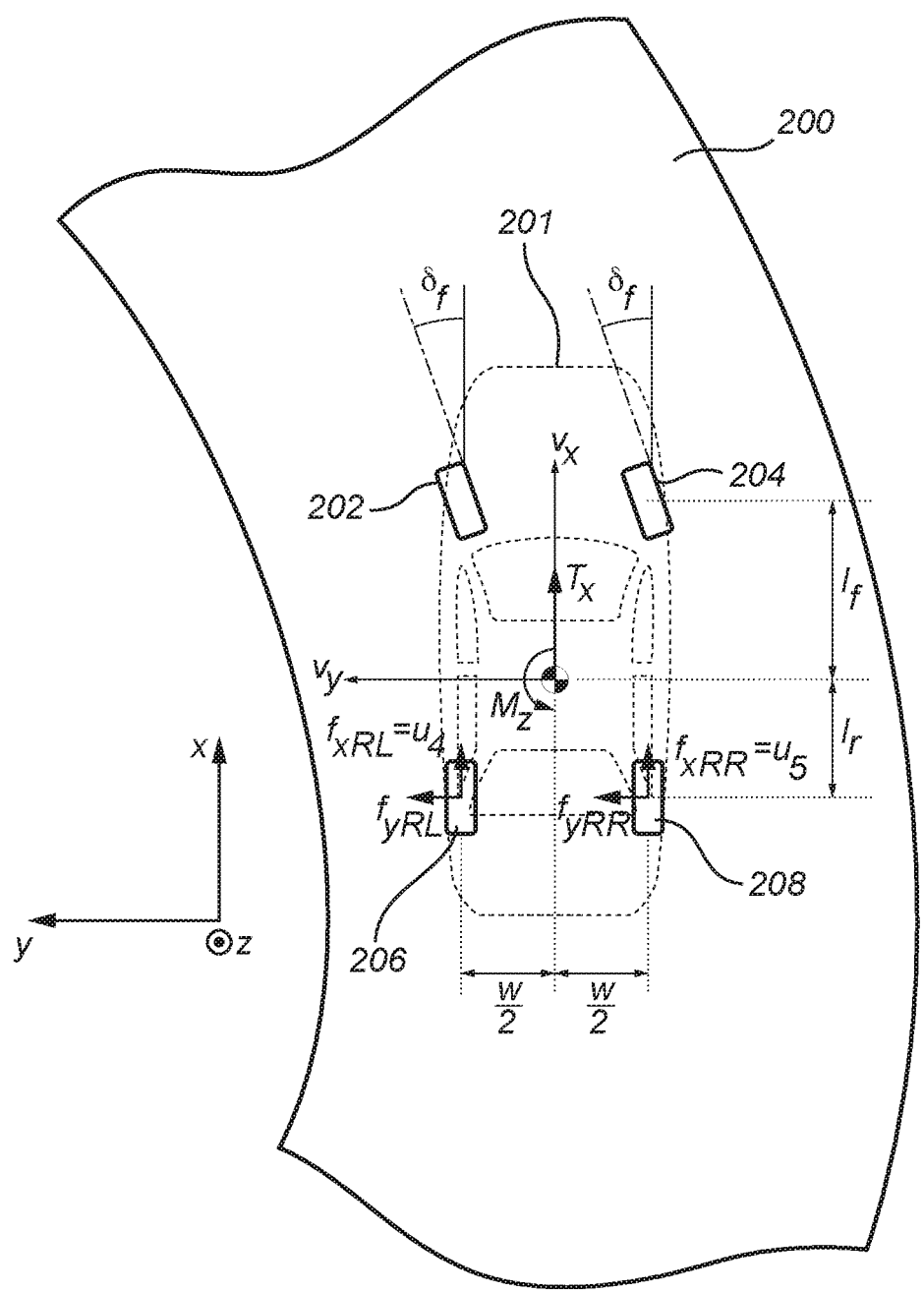
FIG. 2 schematically illustrates the wheels of a vehicle during a cornering event.

FIG. 2 schematically illustrates the wheels of a vehicle 201 during a cornering event when travelling on a road 200. The wheels are a front left wheel 202, a front right wheel 204, a rear left wheel 206, and a rear right wheel 208. The vehicle is subjected to a longitudinal torque ($T_x$) which is the total longitudinal torque provided from all the wheels (202, 204, 206, 208). The longitudinal torque is directed along a forward-rearward axis (x) of the vehicle. Generally, torque is provided from the drive train of the vehicle, which multiplied by the wheel radius, provides a traction force for the vehicle.

$M_z$ is the total yaw torque acting on the vehicle around an axis in the z-direction, as provided by the forces acting on the wheels (202, 204, 206, 208), including the indirect yaw torque. Furthermore, $f_{xRL}$ is the longitudinal force on the rear left wheel 206, $f_{yRL}$ is the lateral force on the rear left wheel 206, $f_{xRR}$ is the longitudinal force on the rear right wheel 208, $f_{yRR}$ is the lateral force on the rear right wheel 208, $f_{xFL}$ is the longitudinal force on the front left wheel 202, $f_{yFL}$ is the lateral force on the front left wheel 202, $f_{xFR}$ is the longitudinal force on the front right wheel 204, and $f_{yFR}$ is the lateral force on the front right wheel 204. In addition, $l_f$ is the distance in the x-y plane from an axis orthogonally intercepting the x-y plane and the center of gravity of the vehicle to the front wheel axis 210, $l_r$ is the distance (in the x-y plane) from the center of gravity of the vehicle and the rear wheel axis 210, and W is the distance between the center of each wheel pair on the same axis (i.e. front or rear wheels).

The yaw torque $M_z$ comprises two components, direct yaw torque provided by the longitudinal forces acting on the wheels (202, 204, 206, 208), and indirect yaw torque caused by lateral forces acting on the wheels (202, 204, 206, 208). In total, the following can be derived from FIGS. 1 and 2:

$$M_{zdir} = -f_{xFL} \cdot \frac{w}{2} + f_{xFR} \cdot \frac{w}{2} - f_{xRL} \cdot \frac{w}{2} + f_{xRR} \cdot \frac{w}{2} \quad (1)$$

$$M_{zindir} = (f_{yFL} - f_{y0FL}) \cdot l_f + \quad (2)$$
$$(f_{yFR} - f_{y0FR}) \cdot l_f - (f_{yRL} - f_{y0RL}) \cdot l_r - (f_{yRR} - f_{y0RR}) \cdot l_r$$

$$M_z = M_{zdir} + M_{zindir} \quad (3)$$

where $f_{y0ij}$ is the lateral force (i=F, R, j=F, R) when no longitudinal force is present, in other words, as represented by the force 104 in FIG. 1. It should be noted that each of the expressions in parentheses in the above equation represents a loss in lateral force as explained with reference to FIG. 1.

$M_{zindir}$ can be interpreted as the expected change in yaw torque due to an expected change in lateral tire force for a certain longitudinal force.

Assuming that the limits given by $\mu F_{zi}$ are provided by an ellipse, then the following expression for the lateral force for each of the wheels (i) can be derived:

$$F_{yivec} = \sqrt{(\mu F_{zi})^2 - (0.9 F_{xivec})^2} \cdot F_{y0i}, \quad (4)$$

where $F_{xivec} = \in_{vec} F_{xreq}$, $\in_{vec} = 0:0.1:1$.
which together with equation (2) provides:

$$M_{zindir} = (F_{yFLvec} - F_{y0FL})l_f + (F_{yFRvec} - F_{y0FR})l_f - (F_{yRLvec} - F_{y0RL})l_r - (F_{yRRvec} - F_{y0RR})l_r. \quad (5)$$

Based on the above equations, it is possible to give the following general expression for the indirect yaw torque:

$$M_{zindir} = k(\varepsilon - a), \text{ where } \varepsilon = \frac{T_{xrear}}{T_x} \quad (6)$$

which gives an expression for the total yaw torque:

$$M_z = M_{zdir} - ka + k\frac{T_{xrear}}{T_x}, \text{ or} \quad (7)$$

$$M_z + ka = M_{zdir} + k\frac{T_{xrear}}{T_x}. \quad (8)$$

For calculating the required torque contribution from each actuator (e.g. propulsion providing unit such as internal combustion engine or an electric machine) acting on the vehicle for providing propulsion during the cornering event a torque equation may have to be solved. A torque equation generally provides a relationship between desired (yaw and longitudinal) torque and the actuators input. Thus, the torque equation may be solved in order to calculate the required torque from each of the actuators in order to provide a desired longitudinal torque ($T_{xReq}$) and desired yaw torque ($M_{zReq}$) as based on driver input. The following system of equations has to be solved:

$$\begin{bmatrix} T_{xReq} \\ M_{zReq} + ak \end{bmatrix} = \quad (9)$$

-continued $$\begin{bmatrix} \cos\delta_f & (k_b - 1 - 1k_b\cos\delta_f) & 1 & 1 & 1 \\ \dfrac{\sin\delta_f l_f}{r_w} & -k_b \dfrac{\sin\delta_f l_f}{r_w} & 0 + \dfrac{k}{T_x} & -\dfrac{w}{2r_w} + \dfrac{k}{T_x} & \dfrac{w}{2r_w} + \dfrac{k}{T_x} \end{bmatrix} \begin{bmatrix} u_1 \\ u_2 \\ u_3 \\ u_4 \\ u_5 \end{bmatrix},$$

where $u_1$-$u_5$ represent the torque provided from each of multiple actuators such as a combustions engine ($u_1$), an all wheel friction break ($u_2$), an electric rear axle drive ($u_3$), and dual electric rear axle drives ($u_4$, $u_5$). The above augmented torque equation comprises the contribution from the indirect yaw torque by the inclusion of the indirect yaw torque parameters a and k contrary to prior art solutions. In other words, solving the above solution for $u_1$-$u_5$ provides the required torques from each of the actuators directly and automatically takes into account the indirect yaw torque.

Since the system of equations (9) is an underdetermined system, it has several possible solutions. There are per se known methods to handle such systems of equations. Generally, the equation can be written on the form x=Bu, where B is the matrix in the above equation (9), u is a vector comprising $u_1$-$u_5$, and x is the desired torques ($T_{xReq}$ and $M_{zReq}$+ak), thus a correct solution would require x−Bu=0.

The problem of solving the equation (9) for u may be formulated as:

$$\min_{u_{min} \leq u \leq u_{max}} (x - Bu)^T Q(x - Bu) \quad (10)$$

$$\text{Cost} = (x - Bu)^T Q(x - B) \quad (11)$$

where Q is used to prioritize between longitudinal torque ($T_x$) and yaw torque ($M_z$). Q may for example specify that we should prioritize to fulfill the longitudinal yaw torque before fully fulfilling the yaw torque request. We solve the above equations for $u_1$-$u_5$ by finding the solution that minimizes the cost function (eq. 11).

The calculated torques ($u_1$-$u_5$) can subsequently be provided by the respective actuator.

Figure 3:
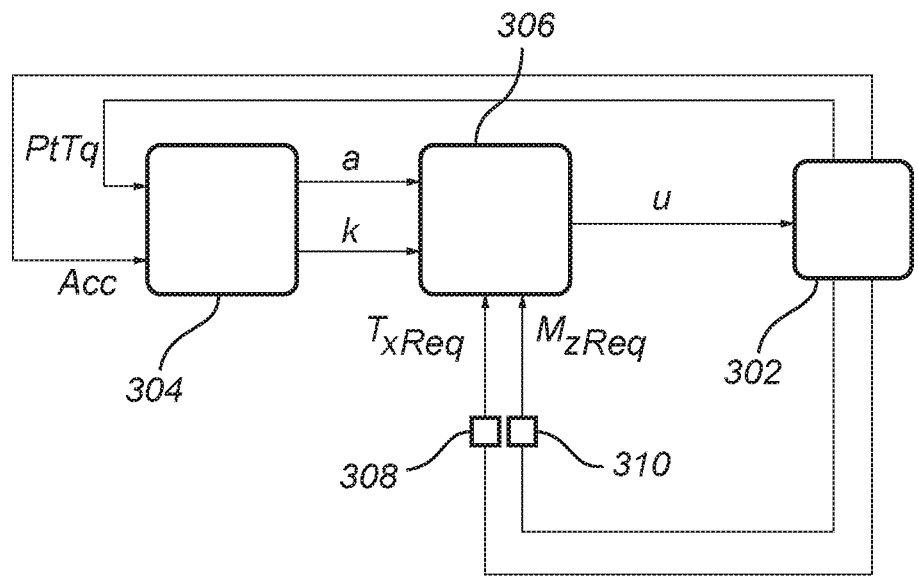
FIG. 3 illustrates a functional block diagram in accordance with the inventive concept.

FIG. 3 illustrates a functional block diagram in accordance with the inventive concept. A vehicle sensor and actuator control module 302 provides present wheel torque data (PtTq) indicative of the torque presently applied to the wheels by the power train of the vehicle. The present wheel torque data includes torque data for each of the wheels (202, 204, 206, 208) of the vehicle. The sensor and actuator control module 302 comprises sensor for sensing e.g. torques applied to the wheels of the vehicle, and e.g. accelerometers etc. Further, the sensor and actuator control module 302 comprises control unit(s) for controlling the actuators to apply calculated torques to the wheels.

Present wheel torque data (PtTq) is provided to an indirect yaw torque calculating module 304. Further, a sensor such as a gyroscope 306 provides acceleration data (Acc) comprising at least lateral acceleration data (LatAcc) to the indirect yaw torque calculating module 304. Based on the lateral acceleration data (LatAcc) and the present wheel torque data (PtTq), the indirect yaw torque calculating module 304 produces the indirect yaw torque parameters a and k based on the lateral acceleration data (LatAcc) and the present wheel torque data (PtTq) and the above mentioned model of the indirect yaw torque versus longitudinal wheel torque distribution in a way that will be described in more detail below. The indirect yaw torque parameters (a,k) are indicative of the indirect yaw torque contribution to the total yaw torque ($M_z$).

The indirect yaw torque parameters (a, k) are received by an torque calculating unit 306 which is configured to solve the above stated problem in equations (9) in order to determine the required torques (u) needed from each of the actuators ($u_1$-$u_5$) to thereby provide the requested desired yaw torque ($M_{zReq}$), and the requested longitudinal torque ($T_{xReq}$). The required torques is provided the sensor and actuator control module 302 which is configured to control the vehicle drive train to apply the required torques.

The requested desired yaw torque ($M_{zReq}$), and the requested longitudinal torque ($T_{xReq}$) are generally based on received vehicle states from the sensor and actuator control module 302 and a model. For example, the requested desired yaw torque ($M_{zReq}$) may be calculated in the control unit 310 based on a so-called "bicycle model" which is generally per se known in the art. In a similar manner may the requested longitudinal torque ($T_{xReq}$) be calculated from driver input, e.g. states related to applying force to a pedal, and a model/calculation relating the input vehicle states to the requested longitudinal torque which is provided to the torque calculating unit 306. The requested longitudinal torque ($T_{xReq}$) may be calculated in control unit 308. The control unit 308 and the control unit 310 may be provided as a single control unit.

Now the determination of the indirect yaw torque parameters (a,k) will be described in more detail.

Figure 4:
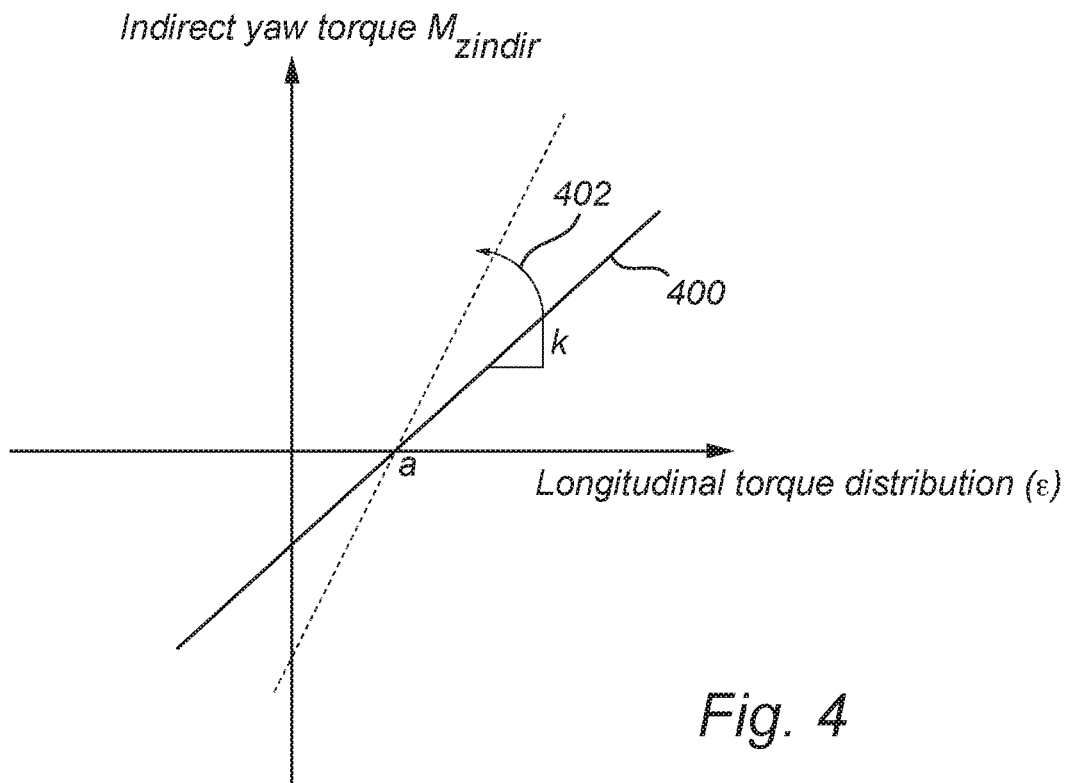
FIG. 4 shows a model relation between indirect yaw torque and longitudinal wheel torque distribution.

For a given lateral acceleration and present wheel torque for each of the wheels, it is possible to calculate the indirect yaw torque ($M_{zindir}$) for a set of longitudinal torque distributions from equations (4) and (5) where ϵ represents the longitudinal torque distributions. Considering equation (5) on the form provided in equation (6), the indirect yaw torque versus longitudinal torque distribution can be illustrated as a straight line 400 as shown in FIG. 4. The dashed line 402 indicates how the curve 400 would change with increasing lateral acceleration (LatAcc) and/or increasing longitudinal torque (PtTq).

From the equation (6) it is straight forward to derive that k is the gradient of the present curve 400 and that a is the longitudinal torque distribution (ϵ) when the indirect yaw torque is equal to zero. In other words, by calculating the relationship between the indirect yaw torque ($M_{zindir}$) and the longitudinal torque distribution for a vector of longitudinal torque distributions it is possible to directly determine the indirect yaw torque parameters a and k. Although performing this calculation for every time sample during the cornering event is a possible implementation, it is relatively time consuming to calculate the entire vector ($M_{zindir}$). A system for calculating the required torques for the vehicle has to operate fast in order to provide a real-time calculation of the required torques from the actuators.

In order to speed up the determination of the required torques ($u_1$-$u_5$), it is advantageous to instead used the model provided in equations (4) and (5) and calculate pre-determined relations between indirect yaw torque ($M_{zindir}$) and the longitudinal torque distribution (∈) for varying lateral acceleration (LatAcc) and longitudinal torque (PtTq).

Figure 5:
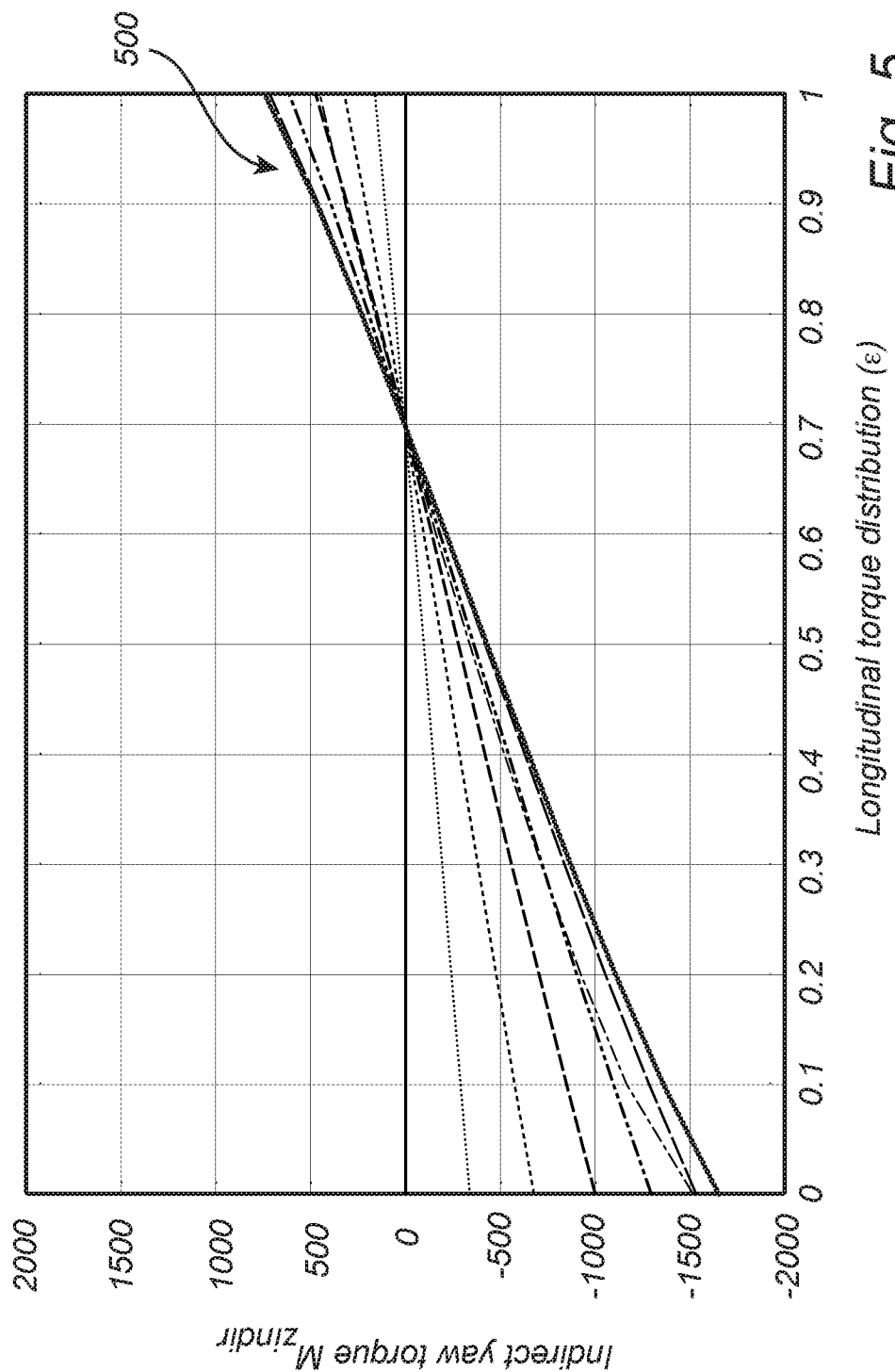
FIG. 5 shows a set of model relations between indirect yaw torque and longitudinal wheel torque distribution for different lateral acceleration and longitudinal torque.

A set of pre-determined relations 500 between indirect yaw torque ($M_{zindir}$) and the longitudinal torque distribution (∈) are conceptually shown in FIG. 5 for different sets of lateral acceleration (LatAcc) and longitudinal torque (PtTq). Thus, for determining the indirect yaw torque parameters a and k, the indirect yaw torque calculating module can compare the received lateral acceleration (LatAcc) and longitudinal torque (PtTq) and map them to the pre-determined relations in order to find a matching relation which has its respective indirect yaw torque parameters a and k. The indirect yaw torque parameters for the matching relation is used by the torque calculating unit 306 in order to subsequently determine the required torques from the actuators ($u_1$-$u_5$) as described above.

Figures 6, 7:
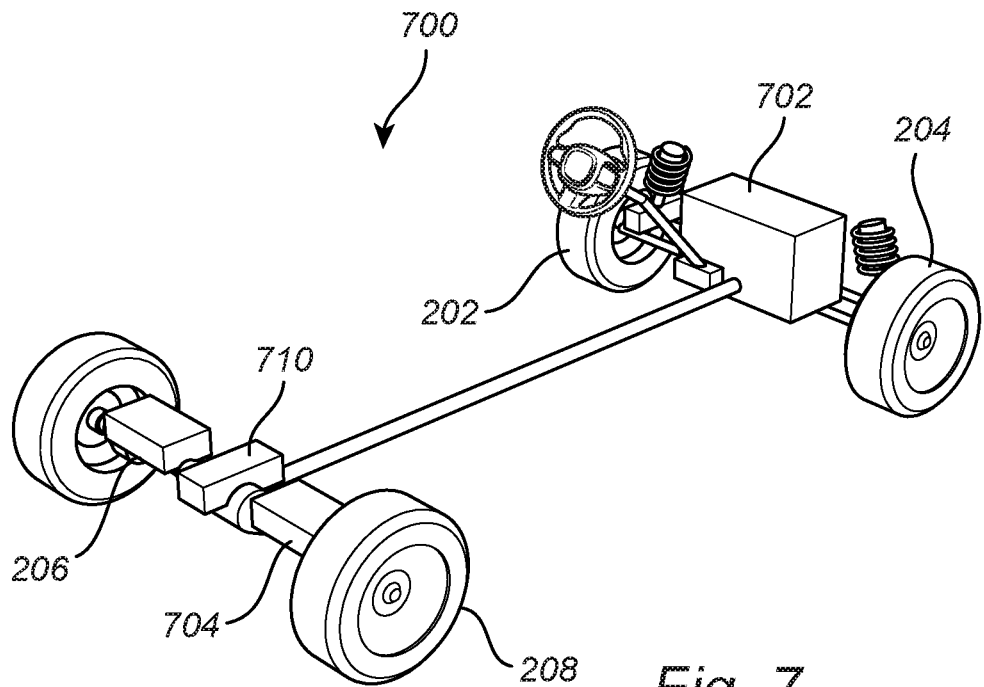
FIG. 6 is an example look-up table in accordance with embodiments of the invention.
FIG. 7 conceptually illustrates possible arrangements of actuators in a vehicle driveline.

In one embodiment, the model as provided in equations (4) and (5) are used to calculate sets of the indirect yaw torque parameters a and k for a plurality of lateral accelerations (LatAcc) and longitudinal torques (PtTq) to form a look-up table 600 as schematically shown in FIG. 6. The indirect yaw torque calculating module (304) is then configured to receive the present lateral acceleration (LatAcc) and longitudinal torque (PtTq) and compare them to the sets of lateral acceleration (LatAcc) and longitudinal torque (PtTq) in the look-up table 600 to find the best match. The indirect yaw torque parameters a and k that corresponds to the matching lateral acceleration (LatAcc) and longitudinal torque (PtTq) are provided to the torque calculating unit 306 in order to determine the required torques (u) from the actuators ($u_1$-$u_5$) as described above.

FIG. 7 conceptually illustrates possible arrangements of actuators in a vehicle driveline. In the illustrated driveline 700, there is an internal combustion engine 702 arranged to provide torque $u_1$ to each the front wheels 202 and 204, respectively. Furthermore, an electric motor 704 and 706 for each of the rear wheels 206 and 208 is arranged to provide torques ($u_4$ and $u_5$) to the individual rear wheels 206 and 208. This rear axle arrangement is commonly referred to as dual electric rear axle drive. Further, there is an individual wheel friction brake (not shown) to provide a torque $u_2$, and an electric motor 710 to provide torque $u_3$ to both the rear wheels 206 and 208. In case the electric motor 710 is not included, $u_3$ may equal $u_4+u_5$.

Figure 8:
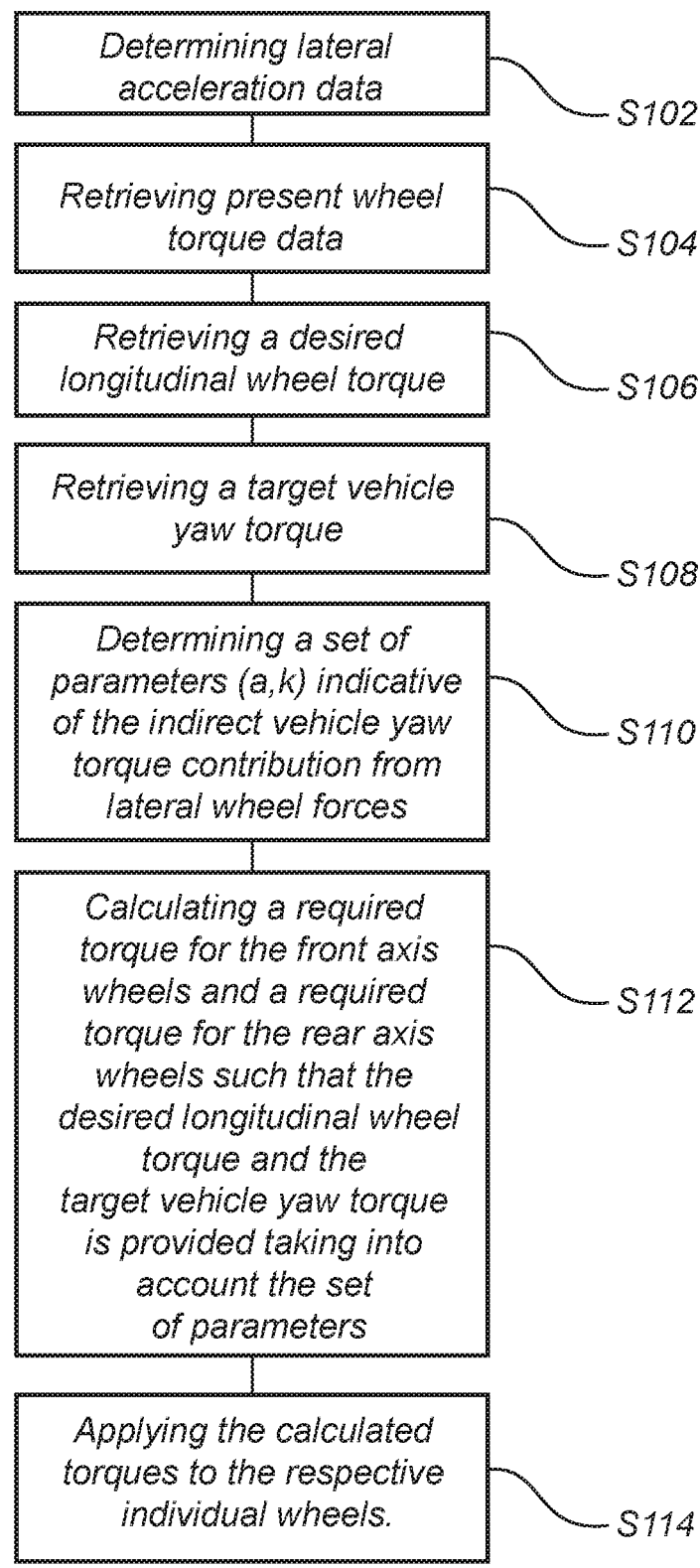
FIG. 8 is a flow-chart of method steps according to embodiments of the invention.

FIG. 8 is a flow-chart of method steps according to embodiments of the invention. In step S102 is lateral acceleration data determined and is indicative of the lateral acceleration of the vehicle. In step S104 is present wheel torque data retrieved and is indicative of the wheel torque presently applied to the wheels by the power train of the vehicle. Further, in step S106 is a desired longitudinal wheel torque retrieved and is based on driver input. In step S108 is a target vehicle yaw torque retrieved and is based on driver input. A set of indirect yaw torque parameters indicative of the indirect vehicle yaw torque contribution from lateral wheel forces is determined in step S110 by comparing the present wheel torque data and the lateral acceleration data to a model comprising a relation between indirect yaw torque and longitudinal wheel torque distribution between the front axis wheels and the rear axis wheels. Further, in step S112 is a required torque calculated for the front axis wheels and a required torque for the rear axis wheels such that the desired longitudinal wheel torque and the target vehicle yaw is provided taking into account the set of indirect yaw torque parameters. In step S114 is the calculated torques applied to the respective individual wheels.

Figure 9:
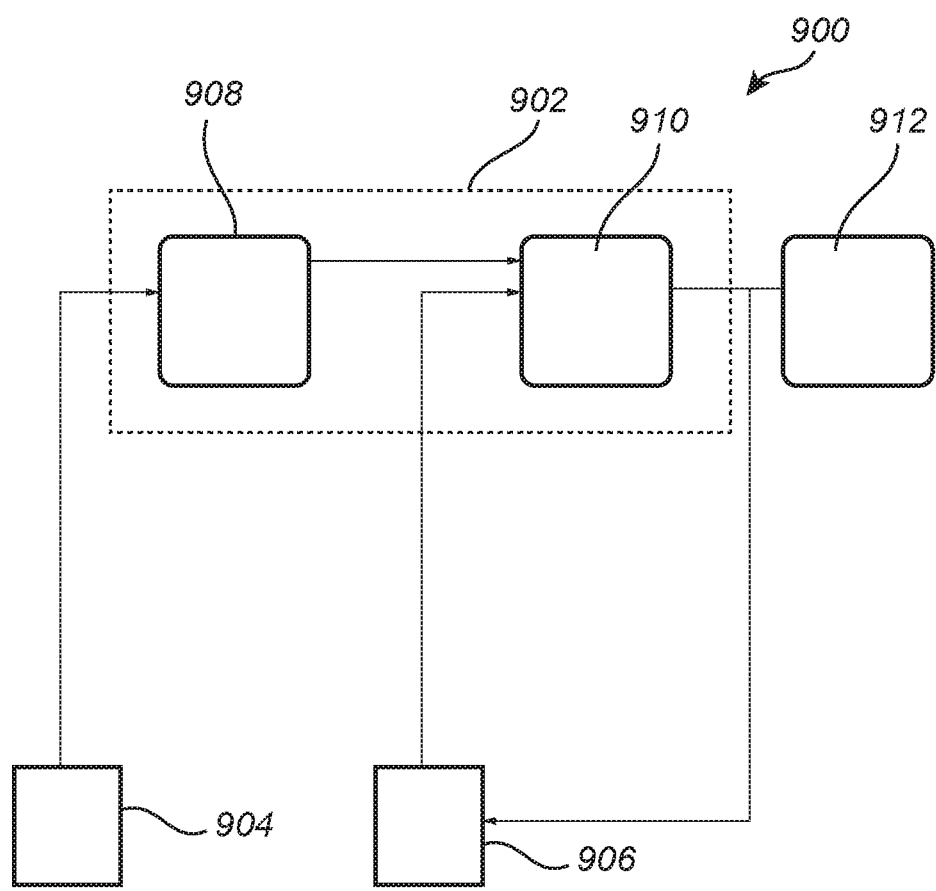
FIG. 9 conceptually illustrates a system according to embodiments of the invention.

FIG. 9 conceptually illustrates a system 900 according to embodiments of the present disclosure. The system comprises a sensor 904 for determining lateral acceleration data indicative of the lateral acceleration of the vehicle. Processing circuitry 902 is here shown as one electric control unit (ECU) 902 including the indirect yaw torque calculating module 908 and the torque calculating module 910. However, the indirect yaw torque calculating module 908 and the torque calculating module 910 may be provided as separate control units. A vehicle control unit 906 is configured to provide present wheel torque data indicative of the wheel torque presently applied to the wheels by the power train of the vehicle, and to determine a desired longitudinal wheel torque based on driver input. Further, the vehicle control unit 906 is also configured to determine a target vehicle yaw torque based on driver input.

The indirect yaw torque calculating module 908 of the electric control unit 902 is configured to determine a set of indirect yaw torque parameters (a,k) as described above with reference to preceding drawings.

Moreover, the torque calculating module 910 of the electric control unit (ECU) 902 is configure to calculate a required torque for the front axis wheels and a required torque for the rear axis wheels such that the desired longitudinal wheel torque and the target vehicle yaw is provided taking into account the set of indirect yaw torque parameters.

A signal indicative of the calculated required torques for the front axis wheels and a required torque for the rear axis wheels is provided to an actuator control module 912 configured to control the power train of the vehicle to apply the calculated torques to the respective individual wheels.

The control unit may include a microprocessor, microcontroller, programmable digital signal processor or another programmable device.

The person skilled in the art realizes that the present invention by no means is limited to the preferred embodiments described above. On the contrary, many modifications and variations are possible within the scope of the appended claims. For example, the examples shown herein include a set of actuators ($u_1$-$u_5$). However, the invention is applicable to other combinations of actuators. For example, actuators $u_1$, $u_2$, $u_4$, and $u_5$ would work equally well. Thus, various combinations of actuators are within the scope of the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

The invention claimed is:

1. A method for controlling wheel torques of a vehicle to provide a desired vehicle yaw torque during a cornering event, the method comprising:
   determining lateral acceleration data (LatAcc) indicative of the lateral acceleration of the vehicle;
   retrieving present wheel torque data (PtTq) indicative of the wheel torques presently applied to each of the wheels by the power train of the vehicle;
   retrieving a desired longitudinal wheel torque (TxReq) value based on driver input;
   retrieving a target vehicle yaw (MzReq) torque value based on driver input;
   determining a set of indirect yaw torque parameters (a,k) indicative of an indirect vehicle yaw torque contribution from lateral wheel forces based on the present wheel torque data (PtTq) and the lateral acceleration data (LatAcc) and a model comprising at least one relation between indirect yaw torque and longitudinal wheel torque distribution between front axis wheels and rear axis wheels for at least one pair of wheel torque data and lateral acceleration data;

calculating a required torque for the front axis wheels and a required torque for the rear axis wheels such that the desired longitudinal wheel torque and the target vehicle yaw (MzReq) is provided taking into account the set of indirect yaw torque parameters; and applying the calculated torques to the respective individual wheels.

2. The method according to claim 1, wherein determining the set of indirect yaw torque parameters comprises:

mapping a data set comprising the lateral acceleration data and the present wheel torque data to a set of pre-stored model relationships pre-determined for multiple sets of indirect yaw torque parameters; and selecting one set of indirect yaw torque parameters based on a match between the data set and one of the model relationships.

3. The method according to claim 2, wherein mapping includes comparing the data set to pre-stored data comprised in a look up table.

4. The method according to claim 1, wherein wheel torques are calculated for at least the total wheel torque required for the front axis wheels, and the wheel torque required for each of the rear axis wheels individually, wherein the torques are applied to the respective wheels.

5. The method according to claim 1, wherein the torque applied to the front wheel axis is provided from an internal combustion engine and the torque applied to the rear axis wheels are provided from at least one electric machine.

6. The method according to claim 1, comprising:

determining longitudinal acceleration data (LongAcc) indicative of the longitudinal acceleration of the vehicle;

estimating a relationship between the indirect yaw torque and the longitudinal wheel torque distribution based on the longitudinal acceleration data, the lateral acceleration data, and the present wheel torque data; and determining the indirect yaw torque parameters indicative of the indirect vehicle yaw torque contribution from lateral wheel forces from the estimated relationship.

7. A system for controlling wheel torques of a vehicle to provide a desired vehicle yaw torque during a cornering event, the system comprising:

a sensor for determining lateral acceleration data (LatAcc) indicative of the lateral acceleration of the vehicle; and processing circuitry configured to:

receive present wheel torque data indicative of the wheel torque presently applied to each of the wheels of the vehicle by the power train of the vehicle;

determine a desired longitudinal wheel torque value based on driver input;

determine a target vehicle yaw torque value based on driver input;

determine a set of indirect yaw torque parameters (a,k) indicative of an indirect vehicle yaw torque contribution from lateral wheel forces based on the present wheel torque data (PtTq) and the lateral acceleration data (LatAcc) and a model comprising at least one relation between indirect yaw torque and longitudinal wheel torque distribution between front axis wheels and rear axis wheels for at least one pair of wheel torque data (PtTq) and lateral acceleration data (LatAcc);

calculate a required torque for the front axis wheels and a required torque for the rear axis wheels such that the desired longitudinal wheel torque and the target vehicle yaw (MzReq) is provided taking into account the set of indirect yaw torque parameters; and control the power train of the vehicle to apply the calculated torques to the respective individual wheels.

8. The system according to claim 7, wherein the calculated torques for the front axis wheels are applied by an internal combustion engine and the calculated torques for the rear axis wheels are applied by at least one electric machine.

9. The system according to claim 8, wherein the calculated torques for the rear axis wheels are applied by one electric machine for each rear wheel.

10. A vehicle, comprising:

a system for controlling wheel torques of a vehicle to provide a desired vehicle yaw torque during a cornering event, the system comprising:

a sensor for determining lateral acceleration data (LatAcc) indicative of the lateral acceleration of the vehicle; and processing circuitry configured to:

receive present wheel torque data indicative of the wheel torque presently applied to each of the wheels of the vehicle by the power train of the vehicle;

determine a desired longitudinal wheel torque value based on driver input;

determine a target vehicle yaw torque value based on driver input;

determine a set of indirect yaw torque parameters (a,k) indicative of an indirect vehicle yaw torque contribution from lateral wheel forces based on the present wheel torque data (PtTq) and the lateral acceleration data (LatAcc) and a model comprising at least one relation between indirect yaw torque and longitudinal wheel torque distribution between front axis wheels and rear axis wheels for at least one pair of wheel torque data (PtTq) and lateral acceleration data (LatAcc);

calculate a required torque for the front axis wheels and a required torque for the rear axis wheels such that the desired longitudinal wheel torque and the target vehicle yaw (MzReq) is provided taking into account the set of indirect yaw torque parameters; and control the power train of the vehicle to apply the calculated torques to the respective individual wheels.

11. The vehicle according to claim 10, wherein the calculated torques for the front axis wheels are applied by an internal combustion engine and the calculated torques for the rear axis wheels are applied by at least one electric machine.

12. The vehicle according to claim 11, wherein the calculated torques for the rear axis wheels are applied by one electric machine for each rear wheel.

13. The vehicle according to claim 10, wherein the vehicle is an all-wheel drive vehicle comprising an internal combustion engine for providing torque to the front axis wheels of the vehicle, one electric machine for providing torque to a first rear axis wheel, and another electric machine for providing torque to a second rear axis wheel.

* * * * *